Patented Mar. 27, 1945

2,372,565

UNITED STATES PATENT OFFICE 2,372,565

HIGH VISCOSITY CELLULOSE PROPIONATE AND METHOD OF MAKING

Robert E. Fothergill, Wilmington, Del., assignor to E. I. du Pont de Nemours & Company, Wilmington, Del., a corporation of Delaware No Drawing. Application February 25, 1942, Serial No. 432,368

7 Claims. (Cl. 260—227)

This invention relates to cellulose esters and more particularly to high viscosity cellulose propionates and methods for their manufacture.

Of the various procedures known for the preparation of cellulose propionate, that involving esterification of cellulose with propionic anhydride using sulfuric acid as catalyst has been generally adopted for the reason that, all points considered, it offers the greater number of advantages. However, one of the main problems in the preparation of the ester by this esterification process has been the development of reaction conditions which would permit rapid and uniform esterification of the cellulose to take place without excessive degradation of the cellulose molecule. All modifications heretofore disclosed in the prior art give cellulose propionates of good solubility characteristics but, at the same time, these products have such low viscosity characteristics, i. e., viscosities of well below 200 centipoises when measured in 5% concentration in acetone at 25° C., especially when they are made on a commercial scale, that they are not satisfactory for use in many of the applications in which cellulose acetate is now employed.

An object of this invention, therefore, is to provide cellulose propionates having a viscosity of at least 200 centipoises when determined in 5% concentration in acetone solution at 25° C.

A further object is to provide a process for esterifying cellulose with propionic anhydride using sulfuric acid as catalyst, which process will operate on a commercial scale to yield cellulose propionates having viscosity of at least 200 centipoises, when determined in 5% concentration in acetone solution at 25° C.

These and other objects will more clearly appear from the description which follows.

These objects are achieved by this invention which, briefly stated, comprises pretreating 100 parts by weight of cellulose with 25–50 parts of aqueous propionic acid of 60–80% concentration for at least four hours, and thereafter esterifying this pretreated cellulose with propionic anhydride in the presence of propionic acid and from 6 to 15 parts of concentrated sulfuric acid as catalyst, while maintaining the reaction temperature below 30° C., until the cellulose is substantially completely esterified. There results cellulose propionate having a viscosity of at least 200 centipoises, and in the preferred modifications having a viscosity in excess of 500 centipoises, when determined in 5% concentration in acetone solution at 25° C.

The preferred method of carrying out this invention is as follows. Cellulose (100 parts by weight) is first pretreated with 30 parts of 70% aqueous propionic acid for a period of eight to sixteen hours at 25° C. This aqueous propionic acid includes the amount of moisture present in the cellulose being used. This can conveniently be done by adding 21 parts of anhydrous propionic acid to 109 parts of cellulose containing 8% moisture. The cellulose and aqueous propionic acid are mixed thoroughly in a suitable closed container equipped with suitable means for agitating or tumbling the cellulose and for maintaining the temperature at the desired degree. At the end of the pretreatment step there is added 400–500 parts of anhydrous propionic acid which is uniformly mixed with the cellulose during a period of one hour at 35° C. The reaction mixture is then cooled and, after fifteen minutes, a solution of 1.5 parts of concentrated sulfuric acid in 50–100 parts of anhydrous propionic acid is added and the cooling and mixing continued. After another fifteen minutes an amount of propionic anhydride sufficient to react with all the water present in the reaction mixture plus about 34 parts of propionic anhydride is added and the entire mixture cooled to 17° C. during a period of one hour. At this time a solution of 8.5 parts of concentrated sulfuric acid in 100 parts of anhydrous propionic acid is added to the reaction mixture at such a rate that its temperature does not rise above 25° C. After again cooling the reaction mixture to 18°–20° C., 350–400 parts of propionic anhydride is added at such a rate that the reaction temperature is maintained below 25°–30° C. After the heat of reaction has subsided, the reaction temperature is maintained at 25° C. by external means. The esterification is continued until a smooth, viscous solution is obtained which is substantially free of undissolved fibers. This requires a period of about six to eight hours from the time at which the propionic acid is added to the pretreated cellulose.

If a primary, i. e., substantially completely esterified product is desired, the cellulose propionate can be precipitated at this stage, but for most purposes a secondary or partially hydrolyzed ester is preferred. The partial hydrolysis of the cellulose ester is carried out by diluting the primary reaction mixture with a solution of 2.5 parts of concentrated sulfuric acid in sufficient water or aqueous propionic acid to react with all the excess propionic anhydride and in addition to this to give a hydrolyzing bath containing about 8% water and 92% propionic acid, and after thorough mixing the solution is held at 38°

C. for a period of eighteen hours. The reaction mixture is diluted with an amount of 30% propionic acid just insufficient to cause precipitation of the cellulose propionate from the hydrolysis solution, and this diluted reaction mixture then poured into cold water with vigorous agitation whereupon the cellulose propionate precipitates in the form of porous flakes.

Cellulose propionate prepared by this procedure, having a degree of substitution of about 2.4 propionyl groups per glucose unit of the cellulose, when dissolved in 5% concentration in acetone forms a solution having a viscosity of 2300—3600 centipoises at 25° C.

This invention is further illustrated in detail in the following examples wherein the quantities of reagents are expressed in parts by weight unless otherwise stated.

Example I

One hundred nine (109) parts of cotton linters containing 8% moisture is placed in a closed reaction vessel with 21 parts of anhydrous propionic acid and the reaction vessel rotated at room temperature (25° C.) for sixteen hours. At the end of this time 473 parts of anhydrous propionic acid is added, the vessel heated by external means to a temperature of 35° C. and rotated at this temperature for one hour. The reaction mixture is then cooled and after fifteen minutes a solution of 1.5 parts of concentrated sulfuric acid in 67 parts of propionic acid is added. Cooling is continued and after another fifteen minutes the temperature is down to 23° C., whereupon 98 parts of propionic anhydride is added. The reaction mixture is continuously agitated and cooled for another half hour when the temperature reaches 17° C. A solution of 8.5 parts of concentrated sulfuric acid in 100 parts of propionic acid is added at such a rate that the temperature of the reaction mixture does not exceed 25° C. At the end of one-half hour the reaction temperature is 20° C. whereupon 366 parts of propionic anhydride is added at such a rate that the reaction temperature does not exceed 27° C. After the heat of reaction subsides, the temperature of the reaction mixture is controlled by external means, and the esterification continued at 25° C. for a period of about three hours after the last addition of anhydride. At this time a clear, very viscous solution is obtained which contains only a few insoluble fibers which can be filtered out of the solution prior to precipitation.

A secondary, or partially hydrolyzed cellulose propionate is obtained from the primary ester formed at this stage by the following procedure. To the primary reaction solution there is added 200 parts of 60% aqueous propionic acid and the temperature raised to 38° C. during fifteen minutes. One hundred thirty (130) parts of 60% propionic acid containing 2.5 parts of concentrated sulfuric acid is then added and the solution mixed thoroughly and stored at 38° C. for a total of eighteen hours (including the time of mixing). The solution is then diluted with 600 parts of 30% propionic acid and filtered in a pressure filter to remove insoluble fibers. The filtered solution is precipitated by pouring into 6000 parts of cold water with vigorous agitation. After washing acid-free, the cellulose propionate is dried at 50–55° C. This cellulose propionate contains 60.4% combined propionic acid which is equivalent to 2.43 propionyl groups per glucose unit of the cellulose. A 5% solution of this cellulose propionate in dry acetone has a viscosity of 3600 centipoises at 25° C. A 10% solution in the same solvent was too viscous to be handled in the Gardner-Holdt viscosity tube which was used for determining viscosity. A film cast from a 75% acetone 25% butyl acetate mixture and aged three days at 65° C. and then tested at 25° C.—50% relative humidity has a tensile strength of 7650 lbs./sq. in., an elongation of 12%, and a flexibility of 13 folds (as determined on a Pfund flexor).

Example II

A cellulose propionate of about the same degree of substitution as that prepared in Example I, and having a viscosity of 15,000 centipoises in 10% solution in acetone at 25° C. is prepared by pretreating 109 parts of cotton linters containing 8% moisture with 21 parts of anhydrous propionic acid for four hours at room temperature (18° C.) and esterifying the pretreated cellulose with the same quantities of reagents and in exactly the same manner as that described in Example I. However, in this case a total esterification time of eight hours is required to obtain a reaction solution sufficiently free of undissolved fiber to be readily filtered. Films prepared from this cellulose propionate in the same manner as that described in Example I have a tensile strength of 8110 lbs./sq. in., an elongation of 18%, and a flexibility of 7 folds with the Pfund flexor.

Instead of the pretreatment with a small amount of aqueous propionic acid described above, a modified procedure may be employed. In this modification, illustrated in the following example, the cellulose is wet thoroughly with water, the water is then displaced with anhydrous propionic acid and the pretreated cellulose then esterified by the same procedure as that described above.

Example III

One hundred six (106) parts of cotton linters containing 4.2% moisture is soaked for sixteen hours in sufficient water to cover the cellulose and then centrifuged to a total weight of 160 parts. The moist linters are then soaked one-half hour in 1000 parts of anhydrous propionic acid and centrifuged to a total weight of 158 parts. The pretreated linters are then placed in a closed reaction vessel, 437 parts of anhydrous propionic acid added and the mixture rotated at 35° C. for one hour. At this time the reaction mixture is cooled to 16°–20° C. and after fifteen minutes 67 parts of propionic acid containing 1.5 parts of concentrated sulfuric acid is added. Fifteen minutes later the temperature reaches 25° C. Sixty (60) parts of propionic anhydride is added and the temperature again lowered until one-half hour later a temperature of 16° C. is reached. One hundred (100) parts of propionic acid containing 8.5 parts of concentrated sulfuric acid is added gradually at such a rate that the temperature of the reaction mixture does not exceed 20° C. when the reaction vessel is cooled further. After one-half hour a temperature of 17° is obtained and 366 parts of propionic anhydride is added gradually. The temperature of the reaction mixture increases to about 29° C., but the rate of the addition of the anhydride is regulated so that the temperature does not go above this figure and is gradually brought down to 25° during a period of one hour and held at 25° by external means. After a total esterification time of 4.5 hours from the time of the addition of the anhydride, a viscous, smooth solution is obtained which contains only a few undissolved fibers. The primary cellulose propionate is hydrolyzed by the same procedure as that described in Example I. The product contains 60.4% combined propionic acid and forms a solution of 5% concentration in dry acetone having a viscosity of 750 centipoises. Films cast in the same manner as in the other examples have a tensile strength of 7560 lbs./sq. in., an elongation of 9%, and a flexibility of 10 folds on the Pfund flexor.

The invention is of course not limited to the exact conditions set out above by way of illustration, but comprehends rather a wide variation of the several essential factors. Thus, in addition to the specific pretreatments described in Examples I to III, pretreatments with 25–40 parts of 60% propionic acid or with 35–50 parts of 80% propionic acid, or with any intermediate proportion of aqueous propionic acid of 60–80% concentration, per 100 parts of dry cellulose may be used. In general it is preferable to use smaller proportions of propionic acid of lower concentration, that is, 25 parts of 60% propionic acid, and larger proportions of acid of higher concentration, for example, 50 parts of 80% acid. The proportions and concentrations of propionic acid referred to in descriptions of this type of pretreatment include the moisture present in the cellulose. The pretreatment with these small amounts of aqueous propionic acid may be made by adding the proper amount of anhydrous acid to cellulose containing sufficient moisture to form aqueous acid of the desired concentration and proportion, or aqueous acid may be added to dry cellulose or cellulose containing insufficient moisture to give the desired pretreating acid of 60–80% concentration in proportions of 25–50 parts per 100 parts of cellulose on a dry basis. The time of pretreatment with these small amounts of aqueous propionic acid can be varied from 4 hours to 24 hours or more. Shorter times than 4 hours do not give uniform activation with this small amount of pretreating acid.

In addition to the pretreatment with water as described in Example III, this same type of pretreatment can be carried out by the use of a large amount of dilute propionic acid of concentration below 50%. In these cases the aqueous propionic acid is displaced by anhydrous propionic acid. The water or the aqueous propionic acid can be displaced by any convenient means. For example, the water can be pressed or centrifuged out and then the cellulose soaked in anhydrous propionic acid and this process repeated until substantially all the water is removed. Also, a continuous countercurrent displacement procedure may be used in which substantially anhydrous cellulose can be obtained continually. The amount of water left in the pretreated cellulose should be kept as low as possible for economical reasons, as any water left in the cellulose must be removed by reaction with propionic anhydride prior to esterification. Large amounts of water left in the pretreated cellulose also cause difficulty in controlling the reaction temperature after the addition of the dehydrating anhydride.

While any of the above described pretreatments may be used, they must be combined with the esterification procedure of this invention if cellulose propionates having a viscosity of more than 200 centipoises in 5% solution in acetone at 25° C. are to be obtained.

The amount of concentrated sulfuric acid catalyst to be used to dehydrate the cellulose should be a quantity just sufficient to cause reaction between proprionic anhydride and water, and insufficient to cause appreciable reaction of the cellulose with the propionic anhydride. A concentration of 1.5% of the weight of the cellulose has been found satisfactory when a reaction period of one hour at 15°–25° C. is used. Lower amounts, e. g. 0.5%, do not produce complete reaction of the water with propionic anhydride under these conditions.

The total amount of concentrated sulfuric acid used in the esterification can be varied between 6 and 15% of the weight of the cellulose. The preferred catalyst concentration is between 8 and 12% of the weight of the cellulose. With this concentration of sulfuric acid and the temperature of reaction held at 25° C. or lower until the cellulose is substantially completely esterified, significant degradation of the cellulose does not take place, and high viscosity cellulose proprionates having a viscosity in excess of 500 centipoises are obtained.

Cellulose used as raw material for the preparation of cellulose propionate may be any of the commercial grades of cotton linters, wood pulp, etc., which are available, for example, for the manufacture of cellulose acetate. The commercial grades of propionic acid and propionic anhydride are entirely suitable for use in this process.

The cellulose propionates produced by this procedure may be precipitated immediately at the end of the esterification to obtain the primary ester or may be subjected to partial hydrolysis by the usual methods for obtaining secondary cellulose esters. Likewise, the cellulose propionates may be subjected to any of the known stabilization procedures to remove combined sulfuric acid.

The cellulose propionates produced according to this invention are useful for the preparation of films, sheets, plastic articles, molding powders, fibers, and any of the other products for which cellulose esters are now being used. My cellulose propionates of high viscosity are particularly useful for the preparation of high tenacity fibers.

I claim:

1. A method for preparing cellulose propionate which comprises subjecting 100 parts by weight of cellulose to the action of from about 25 to about 50 parts by weight of aqueous propionic acid of from about 60% to about 80% concentration for a period of at least four hours to form a pretreated cellulose, and thereafter reacting said pretreated cellulose with propionic anhydride in amount at least equal to the amount theoretically required to substantially completely esterify the cellulose, in the presence of propionic acid as diluent and from about 6 to about 15 parts by weight, based on the weight of cellulose, of concentrated sulfuric acid as catalyst while maintaining the reaction mass below about 30° C., whereby to form cellulose propionate of high viscosity.

2. A method for preparing cellulose propionate which comprises subjecting 100 parts by weight of cellulose to the action of from about 25 to about 50 parts by weight of aqueous propionic acid of from about 60% to about 80% concentration for a period of at least four hours to form a pretreated cellulose, and thereafter reacting said pretreated cellulose with propionic anhydride in amount at least equal to the amount theoretically required to substantially completely esterify the cellulose, in the presence of propionic acid as diluent and from about 8 to about 12 parts by weight, based on the weight of cellulose, of concentrated sulfuric acid as catalyst while maintaining the reaction mass below about 30° C., whereby to form cellulose propionate of high viscosity.

3. A method for preparing cellulose propionate which comprises subjecting, for a period of not less than four hours, 100 parts by weight of cellulose to the action of from about 25 to about 50 parts by weight of aqeous propionic acid of a concentration varying from about 60% to about 80%, the concentration of acid increasing with an increase in the amount of propionic acid used, to form a pretreated cellulose, and thereafter reacting said pretreated cellulose with propionic anhydride in amount at least equal to the amount theoretically required to substantially completely esterify the cellulose, in the presence of propionic acid as diluent and from about 6 to about 12 parts by weight, based on the weight of cellulose, of concentrated sulfuric acid as catalyst while maintaining the reaction mass below about 30° C., whereby to form cellulose propionate of high viscosity.

4. The process for preparing cellulose propionate which comprises intimately contacting 100 parts by weight of cellulose with about 30 parts by weight of propionic acid of about 70% concentration for a period of from about eight to about sixteen hours to form a pretreated cellulose, mixing said pretreated cellulose with about 400 to 450 parts of anhydrous propionic acid, adding to said mixture a solution of about 10 parts of concentrated sulfuric acid in about 150 to 200 parts of anhydrous propionic acid, and reacting the resulting mixture at a temperature below about 30° C., with an amount of propionic anhydride at least equal to the amount theoretically required to substantially completely esterify the cellulose, continuing the reaction until the cellulose is substantially completely esterified, and thereafter, if desired, hydrolyzing the ester formed to the desired degree of substitution.

5. A cellulose propionate produced by the process of claim 1, and further characterized by a viscosity of not less than 200 centipoises when dissolved in 5% concentration in acetone at 25° C.

6. A cellulose propionate produced by the process of claim 2, and further characterized by a viscosity of not less than 500 centipoises when dissolved in 5% concentration in acetone at 25° C.

7. A secondary cellulose propionate produced by the process of claim 4, said cellulose propionate containing about 2.4 propionyl groups per glucose unit of cellulose, and further characterized by a viscosity in excess of 2300 centipoises when dissolved in 5% concentration in acetone at 25° C.

ROBERT E. FOTHERGILL.